United States Patent
Backfolk et al.

(10) Patent No.: US 11,479,915 B2
(45) Date of Patent: Oct. 25, 2022

(54) METHOD FOR MANUFACTURING INTERMEDIATE PRODUCT FOR CONVERSION INTO MICROFIBRILLATED CELLULOSE

(71) Applicant: Stora Enso OYJ, Helsinki (FI)

(72) Inventors: Kaj Backfolk, Villmanstrand (FI); Isto Heiskanen, Imatra (FI); Esa Saukkonen, Lappeenranta (FI); Katja Lyytikäinen, Imatra (FI); Heidi Saxell, Stockholm (SE)

(73) Assignee: Stora Enso OYJ, Helsinki (FI)

( * ) Notice: Subject to any disclaimer, the term of this patent is extended or adjusted under 35 U.S.C. 154(b) by 272 days.

(21) Appl. No.: 16/316,864

(22) PCT Filed: Jul. 3, 2017

(86) PCT No.: PCT/IB2017/054007
§ 371 (c)(1),
(2) Date: Jan. 10, 2019

(87) PCT Pub. No.: WO2018/011669
PCT Pub. Date: Jan. 18, 2018

(65) Prior Publication Data
US 2019/0292727 A1    Sep. 26, 2019

(30) Foreign Application Priority Data

Jul. 11, 2016    (SE) .................................. 1651027-3

(51) Int. Cl.
| | | |
|---|---|---|
| *D21H 13/04* | (2006.01) | |
| *C08B 11/12* | (2006.01) | |
| *C08B 15/04* | (2006.01) | |
| *D21H 11/18* | (2006.01) | |
| *D21C 9/00* | (2006.01) | |
| *C08L 1/02* | (2006.01) | |

(52) U.S. Cl.
CPC .............. *D21H 11/18* (2013.01); *C08B 11/12* (2013.01); *C08B 15/04* (2013.01); *C08L 1/02* (2013.01); *D21C 9/002* (2013.01); *D21C 9/007* (2013.01); *D21H 13/04* (2013.01)

(58) Field of Classification Search
CPC ................................. D21H 11/20; D21C 9/002
See application file for complete search history.

(56) References Cited

U.S. PATENT DOCUMENTS

| | | | | |
|---|---|---|---|---|
| 3,677,886 A | * | 7/1972 | Forssblad et al. ....... | A61L 15/28 162/72 |
| 5,114,534 A | * | 5/1992 | Rachor .................... | D21C 9/18 162/100 |
| 5,273,625 A | * | 12/1993 | Antolovich .............. | D21C 9/02 162/181.2 |
| 5,667,637 A | | 9/1997 | Jewell et al. | |
| 6,348,436 B1 | | 2/2002 | Langlois et al. | |
| 6,379,494 B1 | * | 4/2002 | Jewell ..................... | C08B 15/04 162/157.6 |
| 6,562,875 B1 | * | 5/2003 | Corbel ............... | B01D 19/0404 162/158 |
| 6,602,994 B1 | | 8/2003 | Cash et al. | |
| 2001/0011516 A1 | | 8/2001 | Cantiani et al. | |
| 2011/0008638 A1 | | 1/2011 | Miyawaki et al. | |
| 2012/0000392 A1 | | 1/2012 | Mukai et al. | |
| 2013/0053454 A1 | | 2/2013 | Heiskanen et al. | |
| 2013/0139980 A1 | * | 6/2013 | Ban ........................ | D21H 17/20 162/74 |
| 2014/0274680 A1 | * | 9/2014 | Nonni .................... | D21C 9/004 502/404 |
| 2015/0027648 A1 | | 1/2015 | Tsuji et al. | |
| 2016/0102433 A1 | | 4/2016 | Nuopponen et al. | |

FOREIGN PATENT DOCUMENTS

| | | | | |
|---|---|---|---|---|
| CA | 1193808 A1 | * | 9/1985 | ............... D21H 3/00 |
| CN | 1227589 A | | 9/1999 | |
| CN | 101952508 A | | 1/2011 | |
| CN | 101994271 A | | 3/2011 | |
| CN | 103572394 A | | 2/2014 | |
| CN | 105229229 A | | 1/2016 | |
| GB | 2284421 | | 6/1995 | |
| GB | 2284421 A | | 6/1995 | |
| JP | 2010202856 A | | 9/2010 | |
| JP | 2015000977 | | 1/2015 | |
| WO | 2013076376 | | 5/2013 | |
| WO | 20130076376 A1 | | 5/2013 | |
| WO | 2013137140 A1 | | 9/2013 | |

(Continued)

OTHER PUBLICATIONS

International Searching Authority, Written Opinion of the International Searching Authority, PCT/IB2017/054007, dated Jan. 18, 2018.
International Searching Authority, International Search Report, PCT/IB2017/054007, dated Jan. 18, 2018.
Chinga-Carrasco, G., "Cellulose fibres, nanofibrils and microfibrils,: The morphological sequence of MFC components from a plant physiology and fibre technology point of view," Nanoscale research letters 2011, 6:417.
Fengel, D., "Ultrastructural behavior of cell wall polysaccharides," Tappi J., Mar. 1970, vol. 53, No. 3.
Xhanari, K. et al., "Reduction of water wettability of nanofibrillated cellulose by adsorption of cationic surfactants," Cellulose, 2011, vol. 18, pp. 257-270, DOI: 10.1 007/s1 0570-01 0-9482-y; pp. 259 "Titrations" and table 2.
Isogai, A. et al., "TEMPO-oxidized cellulose nanofibers," Nanoscale, 2011, vol. 3, pp. 71-85, DOI: 10.1 039/c0nr00583e; pp. 73-74—"2 TEMPO-mediated oxidation of celluloses" and figures 3-4.

(Continued)

*Primary Examiner* — Anthony Calandra
(74) *Attorney, Agent, or Firm* — Greer, Burns & Crain, Ltd.

(57) ABSTRACT

The present invention relates to a method for manufacturing an intermediate product that can be stored and transported and efficiently converted into microfibrillated cellulose with limited energy input at the time of conversion. More specifically, the invention involves the use of dewatered carboxymethylcellulose or carboxylated cellulose fiber having a low degree of substitution and a high amount of additives.

9 Claims, No Drawings

(56) References Cited

FOREIGN PATENT DOCUMENTS

| WO | 2013150475 | 10/2013 |
| WO | 20130150475 A1 | 10/2013 |
| WO | 2015082774 | 6/2015 |
| WO | 2016024046 | 2/2016 |

OTHER PUBLICATIONS

Naderi, A. et al., "Microfluidized carboxymethyl cellulose modified pulp: a nanofibrillated cellulose system with some attractive properties," Cellulose, 2015, vol. 22, pp. 1159-1173, DOI: 10.1007/s10570-015-0577-3; Abstract, pp. 1161, 1163.

Uematsu, Takehiko, et al. "Cellulose Wet Wiper Sheets Prepared with Cationic Polymer and Carboxymethyl Cellulose Using a Papermaking Technique." Cellulose, vol. 18, No. 4, 2011, pp. 1129-1138., doi:10.1007/s10570-011-9536-9.

Anderson, Robin E., et al. "Multifunctional Single-Walled Carbon Nanotube-Cellulose Composite Paper." Journal of Materials Chemistry, vol. 20, No. 12, 2010, p. 2400., doi:10.1039/b924260k.

Zhang, Meiyun, Papermaking Technology, China Light Industry Press, 1st Edition, Jan. 31, 2014.

Chinese Office action from corresponding Chinese application No. CN201780042481.4 dated Jul. 28, 2021.

\* cited by examiner

METHOD FOR MANUFACTURING INTERMEDIATE PRODUCT FOR CONVERSION INTO MICROFIBRILLATED CELLULOSE

This application is a U.S. National Phase under 35 U.S.C. § 371 of International Application No. PCT/IB2017/054007, filed Jul. 3, 2017, which claims priority under 35 U.S.C. §§ 119 and 365 to Swedish Application No. 1651027-3, filed Jul. 11, 2016.

TECHNICAL FIELD

The present invention relates to a method for manufacturing an intermediate product that can be stored and transported and efficiently converted into microfibrillated cellulose with limited energy input at the time of conversion. More specifically, the invention involves the use of dewatered carboxymethylcellulose or carboxylated cellulose fiber having a low degree of substitution and a high amount of additives.

BACKGROUND

The manufacturing of intermediate products for microfibrillated cellulose or nanofibrillar cellulose is known from the prior art. The functionalization of cellulose fiber with small amounts of charged groups promote swelling and further the fibrillation, i.e. liberation of individual fibrils or fibril aggregates. At the same time as fiber is able to swell and at the same time well suited for fibrillation, the intermediate product becomes much more difficult to dewater.

U.S. Pat. No. 6,602,994 is directed to a method for producing derivatized microfibrillar polysaccharide. In a derivatizing step, a non-microfibrillar polysaccharide is contacted with a swelling agent, such as an anionic reagent under alkaline conditions. Microfibrillation is then accomplished by applying energy to the non-microfibrillar polysaccharide.

US20130053454 is directed to a method wherein cellulosic fibers are pre-treated by mechanical, chemical and/or enzymatic treatment and mixed with pigments to form a dispersion and then dispersing the dispersion of pre-treated cellulosic fibers and pigments whereby a composition comprising microfibrillated cellulose is formed.

JP2015000977 is directed to a method for producing carboxymethyl cellulose nanofibers from carboxymethyl cellulose in an aqueous medium by jet treatment at a high pressure of 100 to 245 MPa.

WO2015/082774A1 is directed to making modified cellulose products which comprises processing cellulose pulp to modified cellulose pulp at a manufacturing location to increase the susceptibility of fibers to disintegration and setting the modified cellulose pulp to a suitable dry matter content and transporting the modified cellulose pulp to a location of use where it is disintegrated to nanofibrillar cellulose.

WO2016024046A1 presents an intermediate product that is partly gelled or fibrillated. The product is preferably modified with carboxylic groups and dewatering is preferably made at low pH. It further emphasize that the pulp consistency is 20-30% after a washing step.

There is still a need for more efficient methods for producing microfibrillated cellulose efficiently and with limited use of energy both in respect of dewatering/drying and fibrillation/mixing, but also when considering the efficient mixing of functional chemicals into the gelled product.

In addition, there is a need to be able to efficiently provide intermediate products that can readily be stored, transported and converted into microfibrillated cellulose on-site and shortly before use in a process for manufacturing a paper or board product. For such intermediate products, it is essential that the intermediate products can be converted into microfibrillated cellulose with limited energy input and ideally without the use of complex fiber activation, wetting agents, enzymatic treatments or expensive equipment.

SUMMARY OF THE INVENTION

It has surprisingly been found that addition of certain functional additives can significantly influence the ability to form an intermediate product comprising carboxymethylcellulose or carboxylated fiber having a low degree of substitution, which can then efficiently be converted into microfibrillated cellulose in a process step wherein said intermediate product is refined, fluidized or homogenized. More specifically, it has been found that by using certain additives or combination of additives when preparing the intermediate product, microfibrillated cellulose can subsequently be obtained from said intermediate product with a limited use of energy and avoiding the use of expensive equipment.

Thus, one embodiment of the present invention is a method for manufacturing an intermediate product which can subsequently be converted into microfibrillated cellulose, comprising the steps of
a) providing an aqueous suspension comprising carboxymethylcellulose or carboxylated cellulose fiber having a degree of substitution less than 0.4; and
b) dewatering the suspension of step a) on a wire to achieve an intermediate product in the form of a sheet or web having at least 30% dry content; wherein said suspension has a concentration of at least one additive of at least 1% by weight of the solids of the suspension.

The intermediate product obtained in step b) typically has an average fiber length of at least 1 mm.

In one embodiment of the present invention, the carboxymethylcellulose used in step a) has been purified prior to step a).

The additive used in step a) is, in one embodiment, a retention aid, dewatering aid, a salt or a combination of any of these additives. The additive used in step a) may be selected from a retention aid, dewatering aid or a combination of any of these additives. Retention and dewatering aids can be either one component, two component or multi-component retention systems. Retention chemicals can also be combined with dewatering aids (there is some overlap between these types of chemicals). Examples of retention chemicals are: polyethylene imines, polyamideamines, polyDADMAC, polyamines, polyaluminum chlorides, polyaluminum sulphates, polyacrylamides, cationic starches, bentonite, montmorollinite, alum, silica or modified silicas such cationic silicas, nanosize cationic minerals such as calcium carbonate, clays, etc. In addition, surface active chemicals like tensides may influence the dewatering rate (e.g. SDS) and re-dispersion but also the re-dispersion and fibrillation in steps c) and d). Also other chemicals that are known to either charge neutralize or flocculate the fibers can be used. The use of co-solvent such as ethanol or isopropanol alcohol or isopropanyl alcohol (IPA) can be used as an additive or co-additive to enhance the dewatering.

A retention or dewatering system is typically comprising a cationic polymer, preferably highly charged, but of course not limited to other functionalized polymers or particles that might positively influence the dewatering such as hydrophobic grafted cationic polymers or pH sensitive polymers, etc.

The retention system may comprise one or several of the above chemicals or analogues of the listed chemicals.

In one embodiment, the product of step a) may be subjected to washing prior to step b).

In one embodiment, the additive in the suspension that is being dewatered in step b) is present in the suspension in step a). In one embodiment, the additive has been added to the suspension in step a). In one embodiment, the additive is added to the suspension in step b), for example by spraying. In one embodiment, the additive is added to the suspension both in step a) and in step b).

The intermediate product obtained in step b), which is in the form of a sheet or web, can readily be stored and transported. It may also be shredded into pieces to facilitate storage and transportation. Said intermediate product obtained in step b) can then be treated as follows:
  c) dissolving the intermediate product of step b) in water to obtain a dispersion, optionally with addition of additives and/or fibers and/or minerals; and
  d) mechanically fibrillating the dispersion of step c) to obtain microfibrillated cellulose.

The product of step d) may then be dosed to a papermaking process. The product of step d) typically functions as an efficient dewatering, strength or retention aid in such a papermaking process. The obtained product can also be used as component in surface sizing, pigmentation, or coating.

In one embodiment of the present invention, the degree of substitution of the carboxymethylcellulose or carboxylated fiber used in step a) is from 0.01 to 0.4, such as from 0.15 to 0.3.

In one embodiment of the present invention, the dewatering in step b) is performed on a wire or porous fabric.

In one embodiment of the present invention, the suspension that is being dewatered in step b) also contains unmodified microfibrillated cellulose and/or oxidized microfibrillated cellulose.

The gram mage of the intermediate product according to present invention is typically at least 10 gsm, such as at least 20 gsm, at least 50 gsm or at least 100 gsm.

In one embodiment or the present invention, the concentration of additives of the suspension that is being dewatered in step b) is at least 1% by weight, preferably at least 5% by weight and more preferably 10% by weight. In one embodiment, the additive is a salt, optionally in combination with one or more retention aid and/or dewatering aid. The salt or salts are typically monovalent or divalent or multivalent metal salts. Examples of such salts are sodium chloride, calcium chloride, sodium sulphate, calcium sulphate, lithium chloride, potassium chloride, sodium bromide, potassium bromide, sodium iodide, potassium iodide, potassium nitride, sodium acetate, potassium hydroxide, sodium citrate, zinc phosphate and iron phosphate. The salt may be added to the suspension in step a) or may be present in the suspension as a product from any previous derivatization step.

In one embodiment of the present invention, the concentration of carboxymethylcellulose or carboxylated cellulose fiber having a degree of substitution less than 0.4 in the suspension in step a) is at least 0.5% by weight of the solids of the suspension, preferably at least 3% by weight of the solids of the suspension, more preferably at least 5% by weight of the solids of the suspension. Solids is any material that would remain after evaporation of the water (such as by evaporating water at a temperature of 105° C. for at least 3 hours). Solids may for example include carboxymethylcellulose and/or carboxylated cellulose fibers and other organic or inorganic material including salts and/or electrolytes. The suspension in step a) may also comprise additional material, such as additional fibers, such as kraft fibers, fines, reinforcement fibers, synthetic fibers, pulp (normal, pre-treated or carboxylated), dissolving pulp, TMP or CTMP, PGW, etc.

In one embodiment of the present invention, the intermediate product obtained in step b) of the present invention has a SR>38, more preferably >40 or >42. SR denotes the Schopper Riegler number which can be determined using methods known in the art.

In one embodiment of the present invention, the microfibrillated cellulose obtained in step d) of the present invention has a SR>90, more preferably >92 or >95. SR denotes the Schopper Riegler number which can be determined using methods known in the art.

In one embodiment of the present invention, additives selected from low molecular weight CMC, optical brightening agents, dyes, polyacrylic-based dispersants, wet strength chemicals, starch, surface active polymers or surfactants, nanopigments, minerals, latexes, biocides, hydrophobic chemicals (rosin resin, AKD, ASA, SMA, etc) and cationic polymers are added in step c).

The microfibrillated cellulose obtained in step d) can for example be used as retention and/or dewatering aid, strength enhancing agent, flocculation aid, adhesive, surface sizing chemical, rheology modifier, barrier, foaming agent, dispersant for e.g. filler, filler, formation agent, OBA carrier agent, spray suspension (e.g. glue), coating additive (e.g. co-binder or thickener), surface sizing additive, printability enhances, gloss enhancer.

In one embodiment of the present invention, the carboxylated cellulose fibers used in step a) may contain up to 15% by weight hemicellulose, such as 5-15% by weight hemicellulose.

In one embodiment of the present invention, the intermediate product obtained in step b) has a dry content of at least 30%, such as at least 40%, at least 50%, at least 60%, at least 70% or at least 80%.

DETAILED DESCRIPTION

In one embodiment of the present invention, the dewatering in step b) is carried out on a wire. The dewatering on wire may, according to one embodiment of the present invention be performed by using known techniques with single wire or twin wire system, pressure dewatering, frictionless dewatering, membrane-assisted dewatering, vacuum- or ultrasound assisted dewatering, etc. The dewatering can optionally be made by using IR, hot air, UV, EB and dryers simultaneously as dewatering or after the dewatering section. According to one embodiment of the present invention the wet web is dewatered by vacuum, i.e. water, and other liquids, is sucked from the furnish when it is placed on the wire. In one embodiment of the present invention, not only water is removed during the dewatering in step b), but also other liquids such as alcohols. After the dewatering, it is possible to dewater further with filter press fabrics or cloths.

The temperature of the web should normally not exceed 85° C. or 95° C.

The dry content of the dispersion in step c) to be treated by mechanical fibrillation in step d) is preferably between 0.5-30% by weight of fibers.

The dry content of the dispersion after it has been treated by the mechanical fibrillation in step d) is preferably above 50% by weight of fibers. The dispersion is preferably dewatered after the mechanical fibrillation in order to increase the dry content. By increasing the dry content, transportation of the dispersion to other sites can be done a more efficient way.

The process may further comprise washing of the dispersion after the mechanical fibrillation in step d).

The mechanical fibrillation in step d) can be done in many different kinds of mechanical treatment apparatus, for example refiners or grinders such as Masuko grinders or conventional refiners or grinders used in pulp and paper industry or those disclosed in prior art to make microfibrillated cellulose. However, it is preferred to use a pressure homogenizer which in a very efficient way will produce microfibrillated cellulose. A high pressure is typically used during mechanical fibrillation, and the pressure is preferably between 500-4000 Bar, more preferably between 1000-2000 Bar. The optimal pressure is often around 1500 Bar. The pressure needed depends on the material being treated. However, too high pressures are often not beneficial to use since the wear of the equipment will be too high. One example of a specific pressure homogenizer is the so called microfluidizer.

In one embodiment of the present invention, foam forming is used in step a). In this embodiment, a tenside or other agent that is useful to create foam, is added to the suspension in step a). In this embodiment, the intermediate product obtained in step b) is more bulky than the intermediate product obtained in embodiments where foam forming is not used in step a).

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides, Tappi J., March* 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 $m^2/g$, such as from 1 to 200 $m^2/g$ or more preferably 50-200 $m^2/g$ when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CMF) defining a cellulose nanofiber material containing multiple elementary fibrils with both crystalline and amorphous regions.

According to another embodiment, the suspension or dispersion may comprise a mixture of different types of fibers, such as microfibrillated cellulose, and an amount of other types of fiber, such as kraft fibers, fines, reinforcement fibers, synthetic fibers, dissolving pulp, TMP or CTMP, PGW, etc.

The suspension or dispersion may also comprise other process or functional additives, such as fillers, pigments, wet strength chemicals, dry strength chemicals, retention chemicals, cross-linkers, softeners or plasticizers, adhesion primers, wetting agents, biocides, optical dyes, fluorescent whitening agents, de-foaming chemicals, hydrophobizing chemicals such as AKD, ASA, waxes, resins etc. Additives can also be added using a size press.

In view of the above detailed description of the present invention, other modifications and variations will become apparent to those skilled in the art. However, it should be apparent that such other modifications and variations may be effected without departing from the spirit and scope of the invention.

The invention claimed is:

1. A process for preparing an intermediate product suitable for subsequent conversion into microfibrillated cellulose comprising the steps of
   a) providing an aqueous suspension comprising carboxymethylcellulose or carboxylated cellulose fiber having a degree of substitution less than 0.4; and
   b) dewatering the suspension of step a) on a wire to achieve an intermediate B product in the form of a sheet or web having at least 30% dry content,
   wherein the additive is a salt or a salt with a retention aid or a dewatering aid or a combination thereof, and
   wherein an additive is added to the suspension in step b) by spraying,
   wherein the concentration of additive in the suspension that is being dewatered in step b) is at least 5% by weight of the solids of the suspension,
   wherein neither the dewatering aid, nor the retention aid, nor the salt comprise a calcium salt, and
   wherein the salt is a monovalent or divalent metal salt selected from sodium chloride, lithium chloride, potassium chloride, sodium bromide, potassium bromide, sodium iodide, potassium iodide, potassium nitride, sodium acetate, potassium hydroxide, sodium citrate, zinc phosphate and iron phosphate.

2. A process according to claim 1, wherein the degree of substitution of the carboxymethylcellulose or carboxylated fiber used in step a) is from 0.01 to 0.4.

3. A process according to claim 2, wherein the degree of substitution of the carboxymethylcellulose or carboxylated fiber used in step a) is from 0.15 to 0.3.

4. A process according to claim 1, wherein the concentration of the additive in the suspension in that is being dewatered in step b) is at least 10% by weight of the solids of the suspension.

5. A process according to claim 1, wherein carboxymethylcellulose is used in step a).

6. A process according to claim 1, wherein carboxylated cellulose fiber is used in step a).

7. A process according to claim 6, wherein said carboxylated fiber contains 5-15% by weight hemicellulose.

8. Process for preparing microfibrillated cellulose comprising the steps of claim 1 and also comprising the subsequent steps of
   c) dispersing the intermediate product obtained in step b) in water to obtain a dispersion, optionally with addition of additives and/or fibers and/or minerals; and
   d) mechanically fibrillating the dispersion of step c) to obtain microfibrillated cellulose.

9. A process for preparing a microfibrillated cellulose comprising the steps of
   a) providing an aqueous suspension comprising carboxymethylcellulose or carboxylated cellulose fiber having a degree of substitution less than 0.4; and
   b) dewatering the suspension of step a) on a wire to achieve an intermediate product in the form of a sheet or web having at least 30% dry content,
   c) dispersing the intermediate product obtained in step b) in water to obtain a dispersion, optionally with addition of additives and/or fibers and/or minerals; and
   d) mechanically fibrillating the dispersion of step c) to obtain microfibrillated cellulose
   wherein an additive is selected from a retention aid, a dewatering aid and a salt or a combination thereof, and
   wherein the additive is added to the suspension in step b) by spraying,
   wherein the concentration of additive in the suspension that is being dewatered in step b) is at least 5% by weight of the solids of the suspension, and
   wherein neither the dewatering aid, nor the retention aid, nor the salt comprise a calcium salt.

* * * * *